United States Patent [19]

Schwetz et al.

[11] Patent Number: 4,524,138

[45] Date of Patent: Jun. 18, 1985

[54] SUBSTANTIALLY PORE-FREE SINTERED POLYCRYSTALLINE ARTICLES OF α-SILICON CARBIDE, BORON CARBIDE AND FREE CARBON AND PROCESS FOR THEIR MANUFACTURE

[75] Inventors: Karl A. Schwetz, Sulzberg; Klaus Reinmuth, Durach; Klaus Hunold, Kempten; Franz Isemann, Oberstdorf, all of Fed. Rep. of Germany

[73] Assignee: Elektroschmelzwerk Kempten GmbH, Munich, Fed. Rep. of Germany

[21] Appl. No.: 491,662

[22] Filed: May 5, 1983

[30] Foreign Application Priority Data

May 13, 1982 [DE] Fed. Rep. of Germany ....... 3218052

[51] Int. Cl.³ .................. C04B 35/56; C04B 35/52
[52] U.S. Cl. .................. 501/90; 264/29.5; 264/29.6; 264/61; 264/63; 264/65; 264/66; 264/325; 501/91
[58] Field of Search ............ 501/90, 91; 264/65, 264/66, 61, 63, 29.5, 29.6, 325

[56] References Cited

U.S. PATENT DOCUMENTS

| | | | |
|---|---|---|---|
| 2,108,794 | 2/1938 | Boyer et al. | 501/91 |
| 2,109,246 | 2/1938 | Boyer et al. | 501/91 |
| 2,636,825 | 4/1953 | Nicholson | 501/91 |
| 3,443,935 | 5/1969 | Lipp | 501/92 |
| 3,998,646 | 12/1976 | Weaver | 501/88 |
| 4,081,284 | 3/1978 | Prochazka et al. | 501/91 |
| 4,124,667 | 11/1978 | Coppola et al. | 501/90 |
| 4,336,216 | 6/1982 | Watanabe et al. | 501/90 |

Primary Examiner—Mark L. Bell
Attorney, Agent, or Firm—Burgess, Ryan & Wayne

[57] ABSTRACT

The invention provides substantially pore-free sintered polycrystalline articles comprising α-silicon carbide, boron carbide and free carbon, the quantitative proportions of which, in percent by weight, are defined by the trapezoidal area having, in the ternary system B/Si/C of FIG. 1 the corner points a = 89.0% $B_4C$, 9.9% α-SiC, 1.1% C
  b = 9.9% $B_4C$, 89.0% α-SiC, 1.1% C
  c = 9.0% $B_4C$, 81.0% α-SiC, 10.0% C
  d = 81.0% $B_4C$, 9.0% α-SiC, 10.0% C

The articles have a density of at least 99% of the theoretical density, an average structural grain size of less than 20 μm and a 4-point flexural strength of at least 400 N/mm². They are manufactured from fine-grained mixtures of α-silicon carbide, boron carbide, carbon and/or material that can be coked to form carbon, in a two-stage sintering process. In the first stage, green bodies preshaped from the powder are subjected to pressureless sintering to a density of at least 95% TD at from 1950° to 2150° C. In the second stage, the sintered articles are subjected to a post-densification to a density of at least 99% TD, by isostatic hot pressing, without encapsulating, at from 1850° to 2150° C. in a high-pressure autoclave under a gas pressure of at least 10 MPa.

10 Claims, 4 Drawing Figures

| POINT IN SYSTEM | PHASE COMPOSITION % $B_4C$ - % SiC - % C | | |
|---|---|---|---|
| a | 89.0 | 9.9 | 1.1 |
| b | 9.9 | 89.0 | 1.1 |
| c | 9.0 | 81.0 | 10.0 |
| d | 81.0 | 9.0 | 10.0 |

| POINT IN SYSTEM | PHASE COMPOSITION %B₄C - % SiC - %C |
|---|---|
| a | 89.0 — 9.9 — 1.1 |
| b | 9.9 — 89.0 — 1.1 |
| c | 9.0 — 81.0 — 10.0 |
| d | 81.0 — 9.0 — 10.0 |

SUBSTANTIALLY PORE-FREE SINTERED POLYCRYSTALLINE ARTICLES OF α-SILICON CARBIDE, BORON CARBIDE AND FREE CARBON AND PROCESS FOR THEIR MANUFACTURE

Sintered articles consisting of polycrystalline silicon carbide and also sintered articles consisting of polycrystalline boron carbide, are known. Owing to the relationship between boron and silicon in the Periodic Table of the Elements, the two carbides have some similar physical properties such as a high melting point, low thermal expansion, high mechanical strength (expressed as the flexural strength at room temperature which remains unchanged even up to approximately 1250° C.), a high modulus of elasticity and very good chemical resistance. There are relatively large differences, however, with respect to specific gravity, hardness, wear resistance, fracture toughness (expressed as resistance to fracture), thermal conductivity, resistance to thermal shock and resistance to oxidation.

Components made of silicon carbide are used in machines which operate at high-temperature for example, as components of gas turbines and are also used in abrasion engineering. Boron carbide articles are also used in abrasion engineering. Since boron has a large cross-section for the absorption of thermal neutrons, boron carbide articles are also used in the field of nuclear technology as neutron absorber rods and shieldings.

BACKGROUND OF THE INVENTION

In an attempt to provide composite materials that have a combination of desirable properties, especially a combination of excellent thermalshock resistance, oxidation resistance and high fracture toughness of silicon carbide, with the hardness, wear resistance and low specific gravity of boron carbide, articles have been made from mixtures of silicon carbide and boron carbide. By varying the proportions of silicon carbide and boron carbide, it should be possible to manufacture articles from mixtures of silicon carbide and boron carbide which have properties required for certain uses that is, for a specific use.

Attempts to manufacture articles from boron carbide/silicon carbide composites were reported as early as 1962. In the early work, mixtures of silicon carbide with from 10 to 90% by volume of boron carbide were hotpressed in graphite moulds under a pressure of 7000 psi (48.2 MPa) at a temperature of 2100° C. Articles having densities of from 93.6 to 96% of the theoretical density (hereinafter abbreviated as % TD) were made by the process (see W. R. Jacoby et al. in "Neutron Absorber Materials for Reactor Control", chapter 4.6 c, pages 221-222, edited by W. Kermit Anderson and Y. S. Theilacker, Naval Reactors, Division of Reactor Development, United States Atomic Energy Commission [1962]). In a similar manner, SiC/B$_4$C plates containing 20 or 50% by volume of B$_4$C, having a density of 3.03 or 2.86 g/cm$^3$, respectively, corresponding to 99 or 100% TD, respectively, have been manufactured from a mixture of silicon carbide powder having an average particle size of 5 μm and boron carbide powder having an average particle size of 2 μm, by hot pressing in graphite moulds at a pressure of 5000 psi (34.5 MPa) and a temperature of 2200° C. (see R. G. Gray and L. R. Lynam, Technical Report WAPD-261 [1963].

Self-bonded SiC/B$_4$C sintered articles that is, articles which have no additional ceramic or metallic binders as accompanying phases, can be produced with very low porosity by the hot pressing or pressure sintering process. Articles having substantially zero porosity can be produced.

The ability to form articles with complex shapes by pressure sintering is limited. Only relatively small and geometrically simple articles can be produced by the process. Furthermore, the process is associated with very high usage of energy and moulding material. Because the composite material is very hard, final machining of hot-pressed shaped articles made from mixtures of silicon carbide and boron carbide must be done with diamond tools, which is expensive and time consuming.

Attempts have been made to replace the expensive hot-pressing process by the pressureless-sintering process, for manufacturing articles from a composite material comprising silicon carbide and boron carbide. The pressure-less-sintering process permits the manufacture of articles having complex shapes without the need for expensive final machining operations and makes possible mass-production and continuous operation.

The pressureless sintering of a SiC/B$_4$C system was reported by S. R. Billington et al. in "Special Ceramics 1964", pages 19-34, edited by P. Popper, British Ceramic Research Association, Academic Press, London and New York [1965]. The examination of articles which had been sintered from α-SiC with additions of from 10 to 30% by weight of B$_4$C at temperatures of from 2200° to 2300° C. were reported by Billington et al. They reported that sintering occurred via formation of a eutectic liquid phase in conjunction with a large volume shrinkage, but that poor densification was achieved (maximum density: 2.65 g/cm3, corresponding to 87.7% TD in the case of a 30% by weight addition of B$_4$C).

Non-porous articles of SiC/B$_4$C can be obtained, however, by infiltration of an eutectic melt of B$_4$C/SiC into pre-shaped articles of α-SiC with subsequent solidification in a temperature gradient (see U.S. Pat. No. 3,852,099). It is very difficult to carry out that process. Owing to the differing thermal expansion of the SiC matrix and the B$_4$C/SiC eutectic articles made by the process tend to form microcracks and have only limited strength.

In contrast, it is possible, using pressureless sintering, to obtain sintered polycrystalline articles comprising silicon carbide, boron carbide and free carbon having a density of at least 85% TD (see U.S. Pat. No. 4,081,284, which corresponds to DE-OS No. 27 34 425). These articles consist of α-SiC and/or β-Sic and free carbon, said silicon carbide having a uniform grain size of less than 10 μm, said boron carbide being present in an amount of 10 to 30% by weight and being uniformly dispersed throughout said bodies in the form of fine grains, said free carbon being present in an amount of 0.001 to 1% by weight in the form of particles submicron in size.

In the process, homogeneous pulverulent mixtures of submicron particles of β-SiC, from 10 to 30% by weight of B$_4$C, and a carbon-containing additive in an amount corresponding to 0.1 to 1% by weight of free carbon, were pre-shaped to form green bodies which were subsequently subjected to pressureless sintering in an inert atmosphere at temperatures of from 2000° C. to below the melting point of the B$_4$C/SiC eutectic.

It is apparent from the disclosure that the amount of boron carbide used, which is in the range of from 10 to 30% by weight, based on the total weight of SiC and B₄C, is critical for achieving the desired density and fine-grained microstructure in the finished sintered articles. With less than 10% by weight of B₄C, the grain growth can not be controlled during sintering and large plate-like SiC crystals are formed and fine-grained microstructure, which is necessary for mechanical strength, can not be obtained. When more than 30% by weight of B₄C is present in the composition, the density falls below 85% TD.

Amounts of free carbon, in the pulverulent starting mixture, significantly in excess of about 1% by weight, based on the total weight of SiC and B₄C, are disclosed but do not provide any significant advantage and function much like permanent pores in the sintered article, in the sense of impairing the ultimate achievable density and strength.

Figure 2:
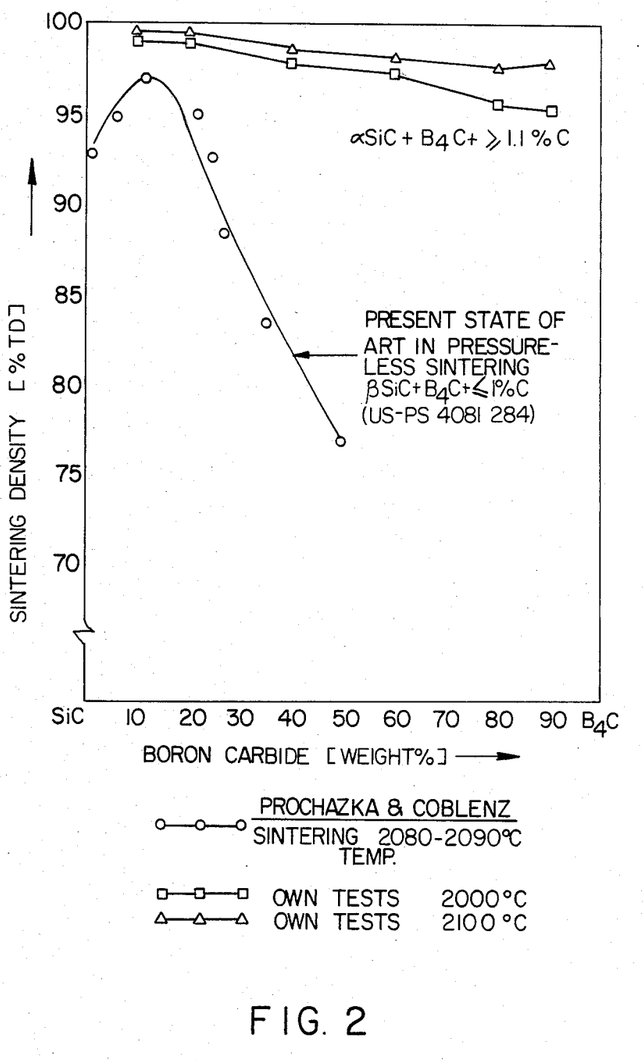
FIG. 2 illustrates the sintering density in % TD as as a function of % B₄C based on the total amount of SiC + B₄C.

The relationship between percent theoretical density and the amount of B₄C additives mixed with the SiC and sintered at from 2080° to 2090° C. is shown in FIG. 2. It can be seen that a maximum of 97% TD was achieved with a B₄C addition of 11.3% by weight, however, when more than 12% by weight of B₄C was in the mixture, the % TD of the resulting B₄C/SiC sintered articles decreased.

According to the known pressureless-sintering process, sintering densities of more than 95% TD can be achieved only with B₄C additions within a very limited range of from approximately 10 to 20% by weight, based on the total weight of SiC and B₄C. Because of high residual porosity, SiC/B₄C sintered articles having densities of less than 95% TD are less resistant to oxidation and less resistant to wear and no longer have the desired combination of properties of SiC and B₄C. Furthermore, the residual porosity adversely affects the mechanical properties. Our own tests have shown that the flexural strength of SiC/B₄C sintered articles having a density of only 90% TD, does not exceed 300N/mm2, and decreases considerably at increased test temperatures.

Furthermore, the submicron sized SiC powders utilized in the known process have been single-phase, or substantially ($\geq$99%) single phase beta-SiC. Beta-SiC, which has a cubic crystalline structure, is a low-temperature form of silicon carbide and is more difficult to produce and potentially more expensive than the alpha(non-cubic) silicon carbide.

BRIEF SUMMARY OF THE INVENTION

It is an object of the invention to make available substantially pore-free sintered articles comprising silicon carbide, boron carbide and free carbon, which can be manufactured by densifying a mixture of SiC powder and B₄C powder in a weight ratio within the range of from 90:10 to 10:90 with the concomitant use of a carbon-containing additive, whereby the choice of properties can be controlled for an intended use.

Figure 1:
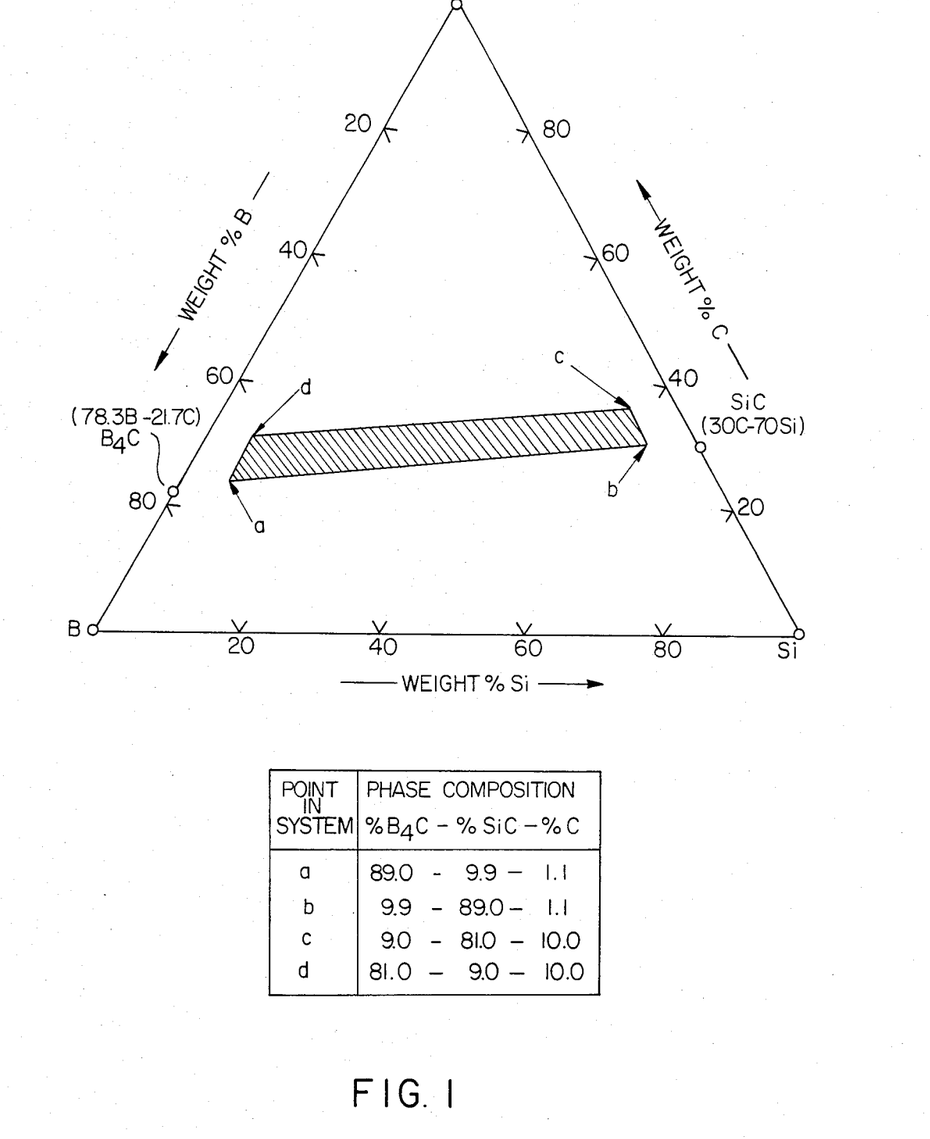
FIG. 1 is a triangular diagram setting for the final phase composition of the sintered polycrystalline articles containing SiC, B₄C and free C according to the present invention.

The substantially pore-free sintered polycrystalline articles according to the invention consist essentially of α-silicon carbide, boron carbide and free carbon, the proportions of which, in percent by weight, are defined by the trapezoidal area in FIG. 1 having, in the ternary system B/Si/C, the corner points a, b, c, and d, which correspond to a mixture having the following compositions:

a = 89.0% B₄C, 9.9% α-SiC, 1.1% C
b = 9.9% B₄C, 89.0% α-SiC, 1.1% C
c = 9.0% B₄C, 81.0% α-SiC, 10.0% C
d = 81.0% B₄C, 9.0% α-SiC, 10.0% C

The articles have a density of at least 99% of the theoretical density, an average microstructural grain size of less than 20 μm, and a 4-point flexural strength of at least 400N/mm². The articles are manufactured from fine-grained mixtures of silicon carbide, boron carbide, carbon and/or organic material that can be coked to form carbon, by pressureless sintering and subsequent post densification of the resulting sintered articles by hot isostatic pressing in a high-pressure autoclave using an inert gas as pressure-transfer medium.

The sintered articles according to the invention may optionally contain small amounts of metallic and non-metallic impurities totalling less than 1% by weight, which are present in the pulverulent mixture used as starting material from manufacture or as milling wear.

DETAILED DESCRIPTION OF THE INVENTION

The phase composition, in percent by weight, of the individual components SiC, B₄C and C in the sintered articles according to the invention, which is defined by the Trapezoidal area having, in the ternary system B/Si/C, the corner points a, b, c and d, is shown diagrammatically in FIG. 1.

The properties of the sintered articles can be varied by altering the composition within the specified framework a-b-c-d. All sintered articles having proportions by weight of SiC, B₄C and C within the defined range have a homogeneous, fine-grained, substantially three-phased microstructure, the average grain size of the SiC and B₄C phases being less than 20 μm, preferably less than 5 μm, and that of the C phase being less than 2 μm, and they have a residual porosity of not more than 1% by volume, as detected by ceramographic examination.

The expression "4-point flexural strength" means the flexural strength measured according to the 4-point method.

In order to manufacture the sintered articles according to the invention, fine particulate powders of α-silicon carbide and boron carbide in a weight ratio of SiC:B₄C of from 90:10 to 10:90 are homogeneously mixed with a carbon-containing additive, in the form of particulate carbon and/or an organic material that can be coked at temperatures of up to approximately 1000° C. to form carbon, in an amount corresponding to about from 1.5 to 12% by weight of free carbon (to distinguish it from the "bonded carbon" contained in the form of SiC and B₄C, this carbon is called "free"). The mixture is shaped into green bodies having a density of at least 50% TD. The green bodies are subjected to pressureless sintering at temperatures of from 1950° to 2150° C. in the presence of a protective gas atmosphere or in vacuo, to form articles having a density of at least 95% TD.

These pre-densified articles are then subjected to a second or post-densification, to a density of at least 99% TD, by hot isostatic pressing, at temperatures of from 1850° to 2150° C. under a gas pressure of at least 10 MPa. The hot isostatic post densification is carried out coverless i.e., without encapsulating the sintered article.

Owing to the carbon-containing additive present in the pulverulent starting mixture, in an amount corresponding to more than 1.5% by weight of free carbon, relative densities of more than 97% TD are obtained during the first pressureless sintering stage of the process over virtually the whole composition range of the SiC/B$_4$C system of weight ratios of SiC:B$_4$C within the range of from 90:10 to 10:90. The advantage of relatively high carbon addition was not recognized in the process disclosed in U.S. Pat. No. 4,081,284. Furthermore, the use of α-SiC powder, instead of β-SiC powder, is advantageous not only for economic reasons, but also because it avoids the occurrence of secondary crystallisation due to a phase transition of β-SiC into the thermodynamically more stable α-form at sintering temperatures within the range of approximately 2000° C., which can result in the formation of an non-homogeneous microstructure in the sintered article.

In carrying out the process according to the invention, the silicon carbide starting material is preferably in the form of a powder having a maximum particle size of 5 μm, preferably 3 μm, and an average particle size of less than 1 μm, preferably less than 0.5 μm, which can be obtained in the required particle size by intensive milling of the grains resulting from the industrial production of SiC according to the Acheson process. Since the determination of an accurate particle size distribution in the case of powders having an average particle size of less than 1 μm is difficult, the specific surface area (measured according to the BET method) can be used for selecting a suitable material. In that case, silicon carbide powders having a specific surface area of from 2 to 50 m$^2$/g, especially from 10 to 20 m$^2$/g, have proved especially useful.

Owing to the high manufacturing temperatures, the SiC manufactured by the Acheson process generally has a predominant percentage of the thermodynamically more stable α-SiC form. Single phase α-SiC can be obtained by sorting out compact pieces taken from the inner regions of the SiC rolls formed in the Acheson resistance furnace. Very good results are achieved starting with single phase α-SiC powders. However, it is preferable, first to subject the α-SiC powder to a wet chemical purification step to obtain α-SiC with a Si+C analysis sum of at least 98% by weight i.e., total silicon+total carbon≧98 w/o. The cleaning removes impurities, especially adhering SiO$_2$ and free Si, which interfere with the sintering operation and/or result in an undesired increase in the residual oxygen content or in the content of metal impurities in the finished sintered article. Up to approximately 1% by weight, in each case, of oxygen and free carbon, and up to a total of approximately 1% by weight of nitrogen and metallic impurities, can be tolerated in the α-SiC starting material.

The boron carbide powder used as starting material preferably has a particle size distribution similar to the SiC powder, corresponding to a maximum particle size of 5 μm, preferably 3 μm, an average particle size of less than 1 μm, preferably 0.5 μm, and a specific surface area of from 3 to 60 m$^2$/g, especially from 15 to 25 m$^2$/g. It is advantageous, for economic reasons, to start with coarse-grained crystalline boron carbide, which has been manufactured on an industrial scale, from boric acid and carbon, using a total boron:total carbon atomic ratio within the range of from 3.8:1 to 4.2:1, according to the melt reduction process in an electric furnace. The coarse boron carbide is subjected first to intensive milling to the required particle size and finally to wet chemical purification up to a B+C analysis sum of at least 96% by weight. Free carbon up to approximately 1% by weight, oxygen up to approximately 3% by weight, which is largely present in the form of hydrated B$_2$O$_3$ and also nitrogen and metallic impurities up to, in total, 1% by weight, can be tolerated in the boron carbide powder.

It is preferred, especially for achieving a homogeneous mixture, to mill the two carbides SiC and B$_4$C together, optionally after the addition of the required amount of free carbon (mixing by milling). The comilling avoids the presence of relatively large, hard agglomerates of the individual carbides in the final mixture. Furthermore, only one wet chemical purification of the final mixture is required to remove the impurities of the individual carbides, which can hinder sintering.

The silicon carbide/boron carbide mixture, optionally together with the carbon-containing additive and a milling liquid, can be milled to sintering fineness in a mill lined with the SiC/B$_4$C/C composite material and having milling elements, e.g., grinding balls, made of the same material (so-called autogeneous milling). In that case, wet chemical purification of the sintering powder or of the sintering powder mixture can be dispensed with completely.

The carbon-containing additive can be used in any form that ensures a uniform distribution in the highly disperse mixture, for example as particulate carbon black or colloidal graphite having a specific surface area within the range of from 10 to 400 m$^2$/g. In order to achieve good pressing qualities of the pulverulent mixtures containing carbon black or colloidal graphite, small amounts of a temporary binder and/or a lubricant are used concomitantly. Examples of such temporary binders are polyvinyl alcohol and polystyrene; examples of lubricants are stearic acid, metal stearates and polyethelene glycol. These pressing auxiliares are used preferably in amounts of up to, in total, a maximum of 2% by weight, based on the resulting mixture.

Preferably, the carbon-containing additive is used in the form of an organic material which can be coked to form carbon at temperatures of up to about 1000° C. Examples of such materialsare phenoplasts, coal-tar pitch, and preferably, phenolformaldehyde condensation products of the novolak and resole types which decompose within the range of from 100° to 900° C. to form amorphous carbon in a yield of approximately 35 to 50%.

When selecting the desired carbon content of from 1.1 to 10% by weight in the end product via the amount of carbon-containing additive in the starting mixture, the free carbon which may be present in the silicon carbide and boron carbide starting powders should be taken into consideration. When carrying out the process according to the invention; it was unexpectedly discovered, that it is possible to use, as starting materials, not only very pure and expensive, carbide powders (free carbon content <0.1% by weight) but also carbide powders of technical purity, that is those powders that are richer in carbon (free carbon content up to approximately 1% by weight). The amount of free carbon present in the pulverulent mixture, optionally after coking the organic material, totalling from 1.15 to 12% by weight, is of critical importance for carrying out the process and for achieving advantageous properties in the sintered article. Amounts of free carbon of less than 1.5% by weight or more than 12% by weight are virtually not effective since predensification of the sintered articles to 95% TD, which is adequate for the subsequent isostatic post-densification, can no longer be achieved by the first pressureless sintering stage.

The method of carrying out the process according to the invention is explained as follows:

First, the silicon carbide powder and the boron carbide powder are homogeneously mixed with the carbon-containing additive, this being preferably achieved by dissolving the carbon additive in the form of organic material in a solvent and dispersing the mixture of the carbide powders in the solution. When using free carbon, the two carbide powders are dispersed, together with the elemental carbon, in a solution of a temporary binder and/or a lubricant. Suitable organic solvents are, for example, acetone and lower aliphatic alcohols having from 1 to 6 carbon atoms. In the case of a thin, liquid suspension, dispersion can be effected by mechanical mixing in a plastic container using a stirrer. In the case of a viscous suspension, dispersion can be effected by kneading in a kneading device. The solvent can then be removed, for example, by spray-drying in the case of a thin liquid suspension, or by evaporation during kneading in the case of a viscous suspension. Hard agglomerates are broken up and a homogeneous distribution of the carbon-containing additive, which activates sintering, can be achieved generally by subsequent dry milling in a jet mill, pin beater mill or ball mill. If mill linings or grinding elements consisting of steel, titanium carbide (Ferrotic), titanium boride or hard metal (tungsten carbide/cobalt alloy) are used for this purpose, care must be taken that impurities in the pulverulent mixture owing to metallic wear are kept as low as possible, that is to say below 1% by weight, preferably less than 0.2% by weight.

The dry milling carried out to break up the agglomerates increases the bulk and decreases the tap-density of the pulverulent mixture by about a factor of 2. For most shaping operations, especially for automatic pressing, a powder having pourability and a high bulk tap-density is required. The highly dispersed pulverulent mixture may be subjected, after the dry milling and before the shaping, to a further granulation step to form soft agglomerates that are unstable when pressed and free-flowing. This granulating stage can be dispensed with if, for example, the powder is further processed with approximately 40% by volume of an organic lubricant and binder to form a plastifiable mass for injection molding.

The shaping to form preshaped green bodies having a density of at least 50% TD can be carried out according to known methods, for example by die-pressing, isostatic pressing, injection moulding, extruding or slip casting. In the case of die-pressing in molds or isostatic pressing, a pressure of from 30 to 600 MPa, preferably from 100 to 500 MPa, is generally used. Subsequently, the preshaped green bodies are subjected to pressureless sintering at temperatures within the range of from 1950° to 2150° C. The temperature range is critical for achieving the desired properties, for it has been shown that, under the same conditions but at lower temperatures, sintered articles having densities below 90% TD are obtained, whereas at higher temperatures, high densities were achieved but at the cost of a perceptible coarsening of the grain structure of the sintered article. A coarse grain structure lowers the strength of the end product.

When using a small amount of the carbon-containing additive in the form of an organic carbonaceous material, the material is coked during the heating operation so that at the beginning of the actual sintering operation, the carbon is present in free form. In the case of green bodies preshaped by injection moulding or extruding, which in general contain up to 40% by volume of temporary organic lubricants and binders, and also green bodies having relatively high proportions of an organic carbonaceous material as the carbon-containing additive (for example consisting of mixtures having more than 7% by weight of novolak), the preshaped green bodies are preheated in a separate process step for careful removal of the lubricant and binder or for slow coking of the organic material. The preheating is preferably carried out in the presence of an inert or reducing atmosphere at temperatures within the range of 100° to 1500° C. If, however, the preshaped green bodies contain only small amounts of lubricant, binder or the organic carbonaceous material, the preshaped green bodies may be subjected to the first sintering stage immediately after shaping. Although the original geometrical shape of the green body is retained, the linear shrinkage, associated with pressureless sintering, of approximately 15 to 20% does occur and can be accurately determined, so that a final machining of the sintered article is generally not required.

The first pressureless-sintering stage can be carried out in any desired high-temperature furnace such as a graphite-tube resistance furnace (Tammann furnace) or an induction-heating furnace having a graphite susceptor. For continuous operation, a horizontal pusher or band-type furnace is advantageously used, in which the preshaped green bodies are transported through the heating zone and, in such a manner, that each article is maintained at the desired end-temperature for a given period of time. The period of time for heating, the dwell time at the final temperature and the cooling are, in that operation, dependent on the size of the green body to be sintered. The preshaped green bodies to be sintered are advantageously accommodated in an inert container, for example in a graphite crucible, and are surrounded by an inert atmosphere. In the presence of an inert atmosphere, which is to be understood as meaning an atmosphere of a protective gas that is inert to the components boron carbide, silicon carbide and carbon, the sintering operation is preferably carried out at normal pressure that is to say, at a pressure of approximately 0.1 MPa. Noble gases such as argon or helium, or alternatively carbon monoxide or hydrogen, may be used as protective gas atmospheres. Alternatively, the shaped green bodies can be sintered in vacuo, a pressure of less than 5000 Pa having proved especially useful.

The predensified shaped articles obtained after the first pressureless-sintering stage have a density of at least 95% TD, preferably more than 97% TD, the residual porosity being exclusively in the form of closed pores. The minimum density of 95% TD achieved by the pressureless sintering is critical for the second stage of the process according to the invention that is, for the hot isostatic post-densification of the predensified articles up to at least 99% TD, since our tests have shown that relatively porous $B_4C/SiC/C$ sintered articles having densities of less than 95% TD have canal pores which are intercommunicating and open to the surface of the article, so that the hot isostatic post-densification cannot be carried out without encapsulating the predensified articles. Indeed, if there are canal pores, the gas serving as pressure-transfer medium may inflate the predensified article by its pressure, which can result in a reduction in the density. In that case, the hot isostatic post densification does not lead to the elimination of pores.

To carry out the second stage of the process according to the invention that is, post densification, the predensified articles having a density of at least 95% TD, preferably 97% TD, are isostatically hot-pressed coverless that is, without an additional vacuum-tight sealed capsule consisting of ductile material, in a high-pressure autoclave preferably having graphite heating elements using an inert gas pressure-transfer medium, at a pressure of from 10 to 250 MPa and at a temperature within the range of from 1800° to 2100° C. High-pressure autoclave furnaces may have a large heating zone so that numerous pre-sintered and predensified articles can be accommodated and together subjected to the post densification. The multidirectional exertion of pressure via a gas results in uniform densification of the pre-sintered articles up to at least 99% TD without texture, that is the physical properties of the pore-free sintered articles are the same in all directions.

The pressure used is preferably within the range of from 150 to 250 MPa and is preferably attained by gradual increase at the final temperature used in each case, which is preferably within the range of from 1950° to 2050° C. If relatively low gas pressures of, for example, 10 MPa are used, it is preferred that the post densification be carried out at the temperature of the pressureless sintering. If relatively high gas pressures, for example more than 100 MPa, are used, the post densification can generally be carried out already at a temperature that is approximately 100° C. lower than that used in the case of pressureless sintering. During the post densification, there is virtually no grain growth so that the pore-free finished articles have substantially the same average grain size as the predensified, pressureless-sintered articles.

Since the multidirectional action of the pressure eliminates interior micro-cracks and micro-pores or substantially reduces their effect, the sintered articles according to the invention having a density of at least 99% TD have considerably greater strength than the pressureless sintered predensified articles.

In addition to the elimination of residual porosity and the improvement in the flexural strength, improvements were detected in other physical properties such as resistance to creep, wear resistance and impact resistance.

The substantially pore-free sintered articles according to the invention consisting essentially of α-silicon carbide, boron carbide and carbon are versatile composite materials. They can be used in all fields of use which require a high degree of hardness, resistance to wear, high-temperature stability and resistance to corrosion, or a combination of those properties. Using the process according to the invention, components having complex shapes can be produced without costly finishing with diamond tools. The present invention permits economic use of these composite materials, in the field of high-temperature machinery.

The advantageous compositions for specific uses can best be explained with reference to the trapezoidal composition area shown in FIG. 1 in the ternary system B/Si/C, which results by connecting the corner points a, b, c and d.

The composite materials rich in silicon carbide having a SiC:$B_4C$ weight rtio within the range of from 90:10 to approximately 60:40, corresponding to the right-hand portion of the trapezoidal area in the direction of the points b→c, can be used as high-temperature materials because of their good resistance to oxidation and thermal shock.

If the carbon content of the composite material is simultaneously increased, corresponding to the upper portion of the trapezoidal area in the direction of points c,→d, the modulus of elasticity is reduced, with a resultant increase in the numerical value for the ratio strength:modulus of elasticity, which has a positive effect on the resistance to thermal shock. Our tests have shown that composite materials having 6% by weight of free carbon have a modulus of elasticity which is approximately 16% lower than that of hot-pressed SiC/$B_4C$ composite materials having no free carbon.

With an increasing content of free carbon and boron carbide, the theoretical density of the high-temperature materials decreases, which results in very favorable values for the strength:density ratio, which is an important structural/mechanical characteristic.

The free carbon in the composite material is in the form of graphite uniformly distributed throughout the whole SiC/$B_4C$ matrix. Relatively high carbon proportions (free carbon content from 5 to 10% by weight) result in improved slide properties of the composite material, with the result that they can be used with special advantage for slide rings, counter rings in slide ring sealings, bearing bushings and ball bearings.

Owing to the chemical resistance of the composite materials with respect to acids, acid mixtures and alkaline solutions, shaped components of that type have proved especially useful in the construction of chemical apparatus. The composite materials are attacked only by oxidizing alkali melts at temperatures greater than 300° to 500° C.

The composite materials rich in boron carbide having a SiC:$B_4C$ weight ratio within the range of approximately from 50:50 to 10:90, corresponding to the left-hand portion of the trapezoidal area in the direction of the points a,→d, can be used in the field of nuclear technology, for example as neutron absorber materials for shieldings and also in the field of wear, for example as abrasion resistant parts in general machinery.

The excellent resistance to wear of the composite materials rich in boron carbide can be attributed to the low SiC content. They have a higher fracture toughness, greater thermal conductivity and greater resistance to oxidation than does pure boron carbide. The hardness of the composites, however, is determined by the boron carbide matrix. Because of the high proportion of boron carbide, these composite materials have a low specific gravity and can be used as light-weight armor plates for the protection of people, combat vehicles, and helicopters against bullets. It is known that armour plates can be made from pure boron carbide by the hot pressing method. The composite materials rich in boron carbide of the present invention have the advantage that relatively cheap starting materials can be used for their manufacture and they can be shaped relatively simply.

The relative density, in % TD, for the shaped green bodies, the pressureless sintered articles, and the post-densified articles is based, in each case, on the theoretical density of the composite material. The theoretical density (TD) is calculated from the final phase composition $B_4C/SiC/C$ (% by weight) of the composite materials according to the law of mixtures.

$$TD = \frac{100}{\frac{SiC \text{ \% by wt}}{3.21} + \frac{B_4C \text{ \% by wt}}{2.52} + \frac{C \text{ \% by wt}}{2.27}} \text{ (g/cm}^3\text{)}$$

$$\% TD = \frac{\text{Actual Density}}{TD} \times 100$$

EXAMPLE 1

Carbide powders of technical purity milled in an Attritor mill to a specific surface area of 17.6 m²/g (Acheson SiC) and 25.3 m²/g ($B_4C$), respectively, were used as starting materials. The chemical analysis of these powders, which have a maximum particle size of 3 μm, is given in Table 1. A commercial pulverulent phenol-formaldehyde resin of the novolak type (ALNOVOL registered Trade Mark from Hoechst AG) was used as the carbon-containing additive. Nine parts by weight of novolak powder, in the form of a solution in acetone, were added to a mixture consisting of 80 parts by weight of SiC powder and 20 parts by weight of $B_4C$ powder. The viscous slurry was kneaded in air until virtually all of the solvent had evaporated. The crumbly powder obtained after kneading had been completed was homogenized and milled, to a bulk density of 0.2 to 0.5 g/cm³, in a jet mill under an air pressure of approximately 0.2 MPa to break up agglomerates. The milled mixture was isostatically pressed in a rubber casing under a pressure of 400 MPa to form plates (green bodies) measuring 50 mm×20 mm×7 mm and having a green density of 1.82 g/cm³.

The green plates were then heated in a coking furnace under a reducing atmosphere. Slow pyrolysis of the novolak resin was effected by heating from room temperature to approximately 1000° C. over a period of approximately 20 hours and by calcining at that temperature for 8 hours. The coked plates were cooled to room temperature under a protective gas over a period of approximately 36 hours and were then sintered at 2100° C. under a vacuum of 10 Pa in a graphite crucible in the heating zone of a graphite tube furnace of the Tammann type. Before being heated, the furnace chamber was flushed several times with purified argon gas. Sintering was effected according to the following temperature schedule:

20°–400° C.: 60 min
400°–2100° C.: 120 min
maintained at 2100° C.: 30 min

At the end of the sintering period, the furnace was switched off and the sintered articles were cooled to room temperature in the furnace. The plates underwent a 7.5% loss in weight and a shrinkage of 16.4%, based on the weight and length, of the unsintered green bodies. The sintered plates had a density, determined according to the archimedes method, of 3.00 g/cm³. Half of the sintered plates were then placed in a hot-isostatic press having a graphite heating system and isostatically hot-pressed at 2000° C. A pressure of 200 MPa was achieved at the final temperature and maintained for 180 minutes. The heat-up time was 120 minutes. The density of the hot-isostatically post densified plates determined according to the archimedes method was 3.01 g/cm³.

The post-densified plates had a SiC content of 76.8% by weight, a $B_4C$ content of 19.2% by weight, a free-carbon content of 3.7% by weight, a residual oxygen content of 0.08% by weight, a nitrogen content of 0.11% by weight, and a content of metallic impurities of less than 0.2% by weight. X-ray diffraction analysis clearly revealed free carbon in the form of graphite alongside hexagonal α-SiC and rhombohedral boron carbide. The theoretical density calculated according to the law of mixtures was 3.01 g/cm³.

$$TD = \frac{100}{\frac{76.8}{3.21} + \frac{19.2}{2.52} + \frac{3.7}{2.27}} \text{ g/cm}^3 = 3.01 \text{ g/cm}^3$$

The relative densities (%TD), of the sintered and post-densified plates, based on a TD of 3.01 g/cm³, were 99.7 and 100.0% TD, respectively.

After the density had been determined by the archimedes method, small prismatic bars measuring 2.0 mm×4.0 mm×34 mm, were prepared from the pressureless-sintered plates (S) and from the post-densified plates (Hot Isostatic Pressure Sintering (HIPS) by cutting and wet grinding with a plastic bonded 90 μm diamond disc. The prismatic bars were used to determine the flexural strength and resistance to oxidation of the composite material.

The time dependence of the increase in weight (in mg/cm² surface area) of the composite articles at a constant test temperature is an indication of the resistance to oxidation. If this function approaches a limiting value, then the articles can be considered as resistant to oxidation, owing to the formation of a coherent surface layer which prevents further reaction of the composite articles with the atmosphere.

The resistance to oxidation was measured isothermally using a recording thermal balance at 950° C. in a stream of air (10 liter/hour). The increase in weight of the samples was recorded for a period of oxidation of 30 hours. The increase in weight was compared with that of pure dense silicon carbide and pure dense boron carbide (see FIG. 4). As can be seen from FIG. 4, an isothermal oxidation curve was obtained for the pressureless-sintered composite material (S 20) and for the post-densified composite material (HIPS 20) which coincided with that of the pure silicon carbide. The increase in weight after oxidation for thirty hours was only 0.2 mg/cm². Sintered articles consisting of 76.9 SiC, 19.1 $B_4C$ and 3.7 C (by weight) therefore have virtually the same high resistance to oxidation as does pure dense SiC under the test conditions. The good resistance to oxidation can be attributed to the formation of a coherent solid protecting layer of boron silicate. The curve of the isothermal oxidation of pure boron carbide (see FIG. 4) is due to the liquid consistency of the $B_2O_3$ surface layer formed on the article and the enhanced diffusion rate of oxygen.

The flexural strength of the sample articles was measured by the four-point method using support distances of 15 mm (upper) and 30 mm (lower). The sample bars, which break in a transcrystalline manner, have the following average flexural strength values at room temperature (average values from 5 measurements): 420 N/mm² (S-bars) and 510 N/mm² (HIPS-bars). A value of 520 N/mm² was obtained for the flexural strength at 1400° C. (HIPS-bars, argon atmosphere). No glassy phase, which could lead to a decrease in strength at high temperatures, is present at the grain boundaries in the shaped articles.

The picture of the fracture surface, taken by a scanning electron microscope, shows that the residual porosity of the pressureless-sintered samples was completely eliminated by post-densification, by means of hot isostatic pressing (HIPS) which is confirmed by the 100% TD found for the relative density. The structure of the etched ground and polished surfaces shows carbon particles having a grain diameter of less than 2 μm embedded in a matrix consisting of fine α-SiC and $B_4C$ grains having an average grain size of 1.5 μm.

EXAMPLES 2 TO 4

Example 1 was repeated with the variation that SiC:$B_4C$ weight ratios of 60:40, 40:60 and 20:80 were used. The carbon containing novolak additive was varied within the range of from 11 to 15% by weight. The results are given in Tables 2 and 3 and are shown in FIGS. 2 to 4.

FIG. 2, which also shows the results of Examples 5, 6, 9, 12, 15, 18, 20 and 21 graphically, gives a comparison of the relative sintering densities achieved with various SiC:$B_4C$ starting compositions using pressureless-sintering according to the process of the invention and also using the known process according to U.S. Pat. No. 4,081,284 (Prochazka and Coblenz).

It can be seen, that according to the process of the present invention, relative densities of more than 97% TD in the case of pressureless sintering can be achieved over the whole range of starting weight ratios of SiC:$B_4C$ of from 90:10 to 10:90. The unexpected discovery is in clear contrast with the prior art according to U.S. Pat. No. 4,081,284 where high densities were obtained only in the case of approximately 11% boron carbide. The shaped articles of Examples 2, 3 and 4 obtained by the process of the present invention have, as a third phase, free carbon in amounts of 4.2, 4.7 and 5.5% by weight, respectively, in addition to a two-phase matrix consisting of α-SiC and boron carbide. The weight ratio of SiC:$B_4C$ in the matrix of the sintered articles corresponds closely to the ratios of 60:40, 40:60 and 20:80 of the starting powder mixtures (see Table 2).

Figure 3:
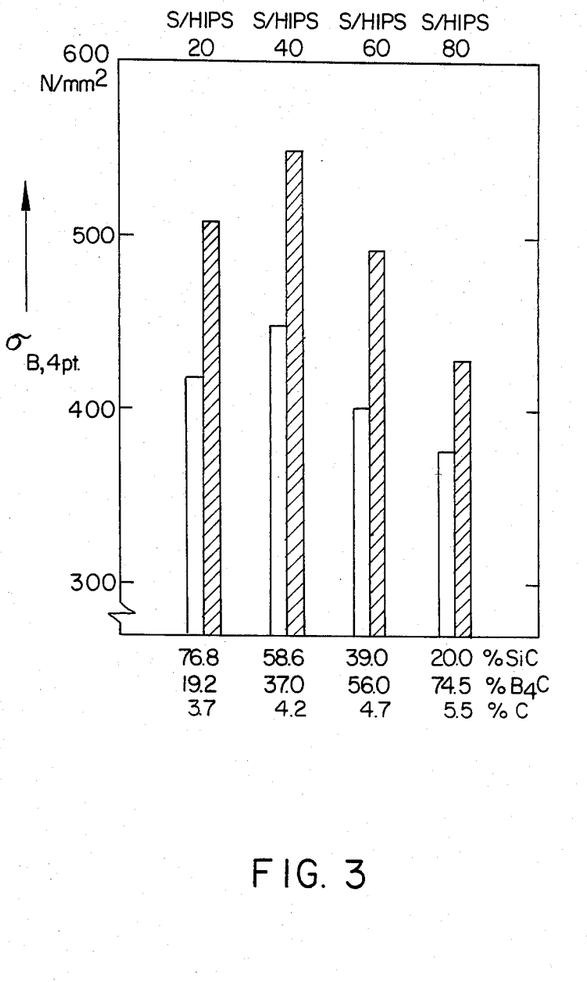
FIG. 3 illustrates the effect of the hot isostatic post densification on the flexural strength of articles made by the process of the invention.
Figure 4:
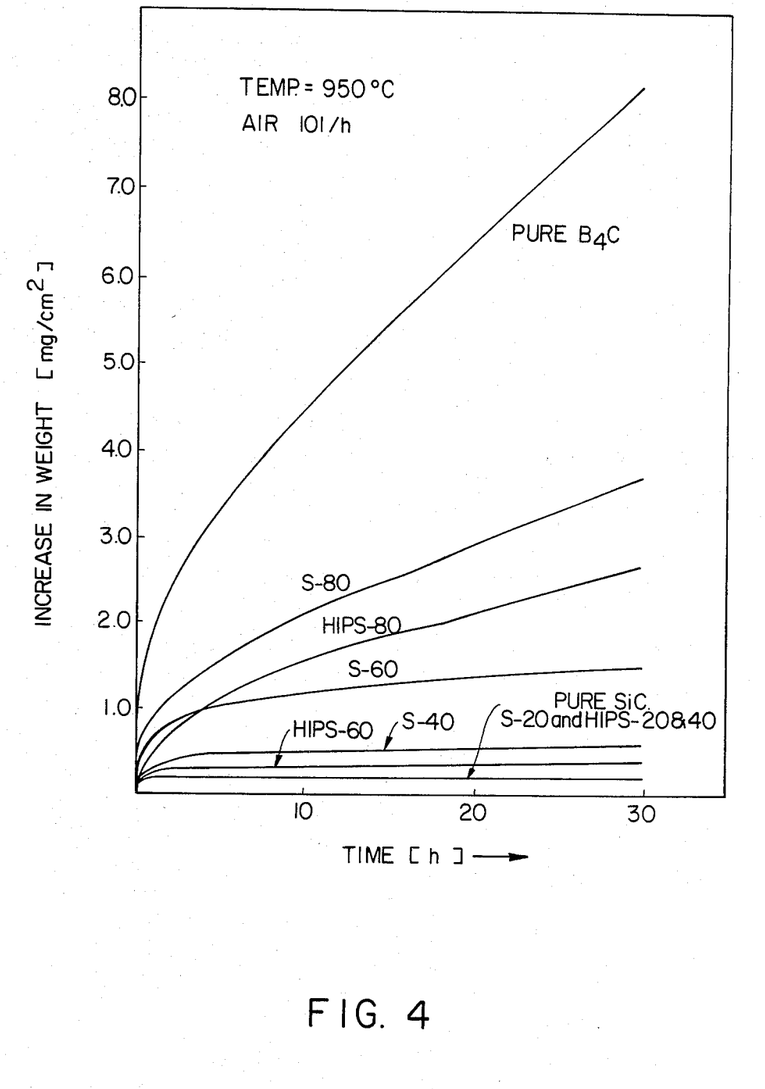
FIG. 4 illustrates the effect of the hot isostatic post densification on the oxidation resistance of articles made by the process of the invention.

The effect of the hot isostatic post densification on the density, average grain size and flexural strength of the pressureless-sintered articles of Examples 1 to 4 can be seen from Table 3 and FIG. 3. As can be seen, the flexural strength, of the samples that have been post densified to relative densities of more that 99.5% TD, is increased by from 14 to 35% with respect to the samples which were only pressureless-sintered, whereas the average grain sizes are virtually unchanged.

It can be seen from FIG. 3 that the articles of Example 2 having a SiC:$B_4C$ weight ratio of approximately 60:40 and a free-carbon content of 4.2% by weight, have the highest flexural strength. FIG. 4 shows a comparison of the oxidation resistance of the pressureless-sintered (S) and post-densified (HIPS) shaped articles of Examples 2, 3 and 4. The isothermal oxidation curves corresponding to the examples are identified by S-40, 60 and 80 and HIPS- 40, 60 and 80. It can be seen that at constant phase composition, the oxidation rate of the post-densified samples is lower than that of the samples which have not been post-densified (compare curve S-80 with curve HIPS-80 and curve S-60 with curve HIPS-60). Furthermore, post-densified samples which are relatively rich in boron carbide can have a greater resistance to oxidation than samples which have not been post-densified and are relatively poor in boron carbide.

It can be seen from a comparison of the curve HIPS-60 with the curves S-40 and S-60, that the sample S-40 has a relatively low oxidation rate, when compared to S-60, due to its relatively high silicon carbide content, but its oxidation rate is higher than the oxidation rate of the boron-rich post-densified sample HIPS-60. Because of their low oxidation rates, the use of a dense material, rich in boron carbide, can therefore be extended to applications in oxidizing atmospheres which had previously been reserved exclusively for pure SiC or materials rich in SiC.

EXAMPLES 5 TO 22

Green bodies from Examples 1 to 4 and green bodies which had been manufactured from the α-SiC and $B_4C$ sintering powders used in Example 1 but having weight ratios of SiC:$B_4C$ of from 90:10 to 10:90 and novolak additions of from 8 to 16% were all subjected to pressureless sintering, in a stream of a protective gas (approximately 0.1 MPa argon), instead of a vacuum (10 Pa argon), at a sintering temperature of between 1900° and 2100° C. The characteristics of the starting mixtures and also the results of the pressureless sintering are given in Table 4. Comparison of the results of the pressureless sintering of Examples 1 to 4 with the results of Examples 8, 11, 14 and 17 shows that, using a sintering temperature of 2100° C., relative sintering densities of more than 97% TD are achieved regardless of the choice of sintering atmosphere (vacuum or flowing protective gas). Table 4 also shows that, at relatively low sintering temperatures, relatively low densifications were achieved. The sintered articles obtained at sintering temperatures of 2000° C. had relative densities of from 95.3 to 99.0% TD. Very poor densifications of from 76 to 90.4% TD, which no longer allowed coverless post-densification, by means of HIPS were obtained at sintering temperatures of 1900° C.

EXAMPLES 23-24

The characteristics of the carbide powders used for these examples are shown in Table 5. Using these sintering powders, carbide mixtures having weight ratios of SiC:$B_4C$ of from 80:20 to 20:80 were prepared analogously to Example 1 and Example 4, with different amounts of carbon additive (see Table 6). The carbon additive was introduced in the form of a solution of phenol-formaldehyde novolak in acetone and additionally as elemental carbon in the form of carbon black (specific surface area: 150 m²/g). The carbon additive was varied within a broad range corresponding to a content of free carbon of from 0.8 to 14.7% by weight of carbon in the resulting mixture of silicon carbide, boron carbide and free carbon. Cylindrical pellets having a diameter of 8 mm, a length of 40 mm and a green density of from 55 to 65% TD were pressed from the mixtures in rubber bags under a pressure of 500 MPa. The green bodies were pressureless-sintered and the sintered articles were hot isostatically post-densified as described in Example 1. The green bodies of Examples 31 to 34 were pre-heated in a coking oven for pyrolysis of the high novolak additions of from 10% by weight. Examples 27 to 32 show that, according to the process of the present invention, high relative densities can be obtained, using carbon-containing additives in amounts that result in shaped articles having a content of from approximately 1.1 to 10% by weight of free carbon, independently of whether carbide mixtures containing large amounts of boron carbide or large amounts of silicon carbide are used. In thid case, all HIPS post-densified sintered articles had relative densities within the range of from 99.8 to 100.0% TD (see Table 6). In the tests carried out for comparison, when insufficient amounts of carbon additive (Examples 23 to 26) and when excess amounts of carbon additive (Examples 33 and 34) were used, only low relative densities of from 82 to 93% TD were achieved. Post-densification by coverless hot isostatic pressing could no longer be achieved in these cases.

TABLE 1

Analysis of the sintering powders

|  |  | alpha-SiC | $B_4C$ |
|---|---|---|---|
| B | (% by weight) | 0.01 | 76.7 |
| Si | (% by weight) | 68.8 | 0.26 |
| C | (% by weight) | 29.8* | 20.4** |
| O | (% by weight) | 0.85 | 2.30 |
| N | (% by weight) | 0.11 | 0.19 |
| Mg | (% by weight) | <0.01 | <0.01 |
| Al | (% by weight) | 0.10 | 0.01 |
| Ca | (% by weight) | <0.01 | <0.01 |
| Ti | (% by weight) | 0.05 | 0.06 |
| Fe | (% by weight) | 0.02 | 0.05 |

*of which 0.89% is free C
**of which 0.80% is free C

TABLE 2

Characteristics of the powder mixtures and sintering results obtained.

|  | Example No. | | | |
|---|---|---|---|---|
|  | 1 | 2 | 3 | 4 |
| Weight ratio of SiC:$B_4C$ | 80:20 | 60:40 | 40:60 | 20:80 |
| Novolak addition based on 100 parts SiC + $B_4C$ powder (%) | 9.0 | 11.0 | 13.0 | 15.0 |
| Free carbon in the starting mixture* (% C by weight) | 4.5 | 5.2 | 6.0 | 6.7 |
| Density of Green Body (% TD) | 60.5 | 61.1 | 61.7 | 62.2 |
| Linear shrinkage (%) | 16.4 | 16.0 | 15.7 | 15.4 |
| Weight loss (%) | 7.5 | 8.5 | 9.4 | 10.7 |
| Relative density (% TD) of the pressureless-sintered article | 99.7 | 98.6 | 98.2 | 97.7 |
| Relative density (% TD) of the post-densified article | 100.0 | 99.7 | 100.0 | 99.6 |
| Phase composition of the post-densified article |  |  |  |  |
| % by weight of SiC | 76.8 | 58.6 | 39.0 | 20.0 |
| % by weight of $B_4C$ | 19.2 | 37.0 | 56.0 | 74.5 |
| % by weight of free C | 3.7 | 4.2 | 4.7 | 5.5 |
| Theoretical density (TD) of the composite materials (g/cm³) | 3.01 | 2.88 | 2.74 | 2.62 |

*including free carbon from the $B_4C$ and SiC starting powders.

TABLE 3

Density, flexural strength and average microstructural grain size of sintered (S) and post-densified (HIPS) shaped articles

|  | Example No | | | |
|---|---|---|---|---|
|  | 1 | 2 | 3 | 4 |
| Density of the S-articles $\rho_S$ (g/cm³) | 3.00 | 2.84 | 2.69 | 2.56 |
| Density of the HIPS-articles $\rho_{HIPS}$ (g/cm³) | 3.01 | 2.87 | 2.74 | 2.61 |
| Theorectical density of the composite materials (g/cm³) | 3.01 | 2.88 | 2.74 | 2.62 |
| Average grain size of the S-articles (μm) | 1.5 | 1.9 | 1.5 | 1.8 |
| Average grain size of the HIPS-articles (μm) | 1.5 | 1.7 | 1.8 | 1.8 |
| Flexural strength $\sigma_{B,4pt}$: |  |  |  |  |
| S-articles (N/mm²) | 420 | 449 | 402 | 377 |
| HIPS-articles | 510 | 550 | 493 | 430 |

TABLE 4

Results of pressureless sintering at various sintering temperatures in flowing argon atmospheres (~1 bar argon)

| Example No. | Weight ratio SiC:$B_4C$ | Novolak addition (%) | Free carbon$^x$ (% C) | Density Green Body (% TD) | Sintering temperature (°C.) | Relative density of the S-article (% TD) |
|---|---|---|---|---|---|---|
| (5) |  |  |  |  | 2100 | 99.6 |
| (6) | 90:10 | 8.0 | 4.1 | 60.0 | 2000 | 99.0 |
| (7) C |  |  |  |  | 1900 | 90.4$^{xx}$ |
| (8) |  |  |  |  | 2100 | 99.3 |
| (9) | 80:20 | 9.0 | 4.5 | 60.5 | 2000 | 99.0 |
| (10) C |  |  |  |  | 1900 | 86.7$^{xx}$ |
| (11) |  |  |  |  | 2100 | 98.3 |
| (12) | 60:40 | 11.0 | 5.2 | 61.1 | 2000 | 97.9 |
| (13) C |  |  |  |  | 1900 | 83.7$^{xx}$ |
| (14) |  |  |  |  | 2100 | 97.8 |
| (15) | 40:60 | 13.0 | 6.0 | 61.7 | 2000 | 97.3 |
| (16) C |  |  |  |  | 1900 | 79.9$^{xx}$ |
| (17) |  |  |  |  | 2100 | 97.3 |
| (18) | 20:80 | 15.0 | 6.7 | 62.2 | 2000 | 95.8 |
| (19) C |  |  |  |  | 1900 | 77.5$^{xx}$ |
| (20) |  |  |  |  | 2100 | 98.0 |
| (21) | 10:90 | 16.0 | 7.0 | 62.3 | 2000 | 95.3 |
| (22) C |  |  |  |  | 1900 | 76.0$^{xx}$ |

Explanation of symbols:
TD = theoretical density
C = for comparison
$^x$in the SiC/$B_4C$/C starting mixture
$^{xx}$post-densification by coverless hot isostatic pressing (HIP) was not possible.

TABLE 5

| Analysis of the sintering powders | | alpha-SiC | B₄C |
|---|---|---|---|
| B | (% by weight) | 0.01 | 76.3 |
| Si | (% by weight) | 69.1 | 0.15 |
| C | (% by weight) | 30.1* | 22.0** |
| O | (% by weight) | 0.42 | 1.05 |
| N | (% by weight) | 0.04 | 0.22 |
| Mg | (% by weight) | <0.01 | <0.01 |
| Al | (% by weight) | 0.05 | 0.02 |
| Ca | (% by weight) | <0.01 | <0.01 |
| Ti | (% by weight) | 0.05 | 0.02 |
| Fe | (% by weight) | 0.04 | 0.02 |
| Specific surface area | (m²/g) | 16.5 | 21.8 |
| Maximum particle size | (μm) | ~2 | ~2 |

*of which 0.79% is free C
**of which 0.95% is free C

TABLE 6

| Example No. | Weight Ratio SiC:B₄C | Novolak addition (%) | Carbon black addition (%) | Free carbon$^x$ (% C) | Relative density of the S-article (% TD) | Relative density of the HIPS-article (% TD) | Free carbon$^{xx}$ (% C) |
|---|---|---|---|---|---|---|---|
| 23 C | 80:20 | 0 | 0 | 0.8 | 82.4 | 84.9 | 0.1 |
| 25 C | 80:20 | 1 | 0 | 1.2 | 93.1 | 94.4 | 0.7 |
| 27 | 80:20 | 2 | 0 | 1.7 | 97.0 | 100.0 | 1.3 |
| 29 | 80:20 | 4 | 0 | 2.4 | 98.2 | 99.8 | 2.0 |
| 31 | 80:20 | 10 | 6 | 10.0 | 99.5 | 99.9 | 9.5 |
| 33 C | 80:2 | 10 | 12 | 14.6 | 90.0 | 90.8 | 14.0 |
| 24 C | 20:80 | 0 | 0 | 0.9 | 82.5 | 82.0 | 0.2 |
| 26 C | 20:80 | 1 | 0 | 1.3 | 90.5 | 91.3 | 0.8 |
| 28 | 20:80 | 2 | 0 | 1.8 | 97.8 | 99.9 | 1.2 |
| 30 | 20:80 | 4 | 0 | 2.5 | 98.5 | 100.0 | 1.9 |
| 32 | 20:80 | 10 | 6 | 10.1 | 97.9 | 99.9 | 9.6 |
| 34 C | 20:80 | 10 | 12 | 14.7 | 92.3 | 93.7 | 14.2 |

Explanation of symbols:
$^x$in the starting mixture
$^{xx}$in the post-densified sintered article
C = for comparison
S-article: pressureless-sintered shaped article
HIPS-article: post-densified sintered article

What is claimed is:

1. A substantially pore-free sintered polycrystalline article consisting essentially of α-silicon carbide, boron carbide and free carbon, the proportions in percent by weight, are defined by the trapezoidal area having, in the ternary system B/Si/C of FIG. 1, the corner points
a = 89.0% B₄C, 9.9% α-SiC, 1.1% C
b = 9.9% B₄C, 89.0% α-SiC, 1.1% C
c = 9.0% B₄C, 81.0% α-SiC, 10.0% C
d = 81.0% B₄C, 9.0% α-SiC 10.0% C;
the article having a homogeneous microstructure and a density of at least 99% of the theoretical density, an average structural grain size of less than 20 μm, and a 4-point flexural strength of at least 400 N/mm² said article being produced from fine-grained mixtures of α-silicon carbide, boron carbide, and a carbon source selected from carbon, an organic material that can be coked to form carbon, and mixtures thereof, by pressureless sintering and subsequent post-densification of the resulting sintered article by hot isostatic pressure sintering using an inert gas as pressure-transfer medium.

2. A sintered article according to claim 1, which contains less than about 1% by weight of metallic and non-metallic impurities.

3. A process for the manufacture of sintered articles which comprises: mixing homogeneously fine particulate α-silicon carbide and fine particulate boron carbide, in a weight ratio of SiC:B₄C of from 90:10 to 10:90, with a carbon source selected from fine particulate carbon, an organic material that can be coked at temperatures up to 1000° C. to from carbon and mixtures thereof in an amount corresponding to from 1.5 to 12% by weight of free carbon; shaping the mixture to form green bodies having a density of at least 50% of the theoretical density; pressureless sintering the green bodies at a temperature of from 1950° to 2150° C. in the presence of a protective gas atmosphere or in vacuo, to form sintered articles having a density of at least 95% of the theoretical density; and post-densifying sintered articles to a density of at least 99% of the theoretical density, by isostatic hot pressure sintering, without encapsulating at a temperature of from 1850° to 2150° C. under a gas pressure of at least 10 MPa.

4. A process according to claim 3, wherein the silicon carbide, has a specific surface area of from 2 to 50 m²/g.

5. A process according to claim 3, wherein the boron carbide powder, has a boron:carbon atomic ratio within the range of from 3.8 to 4.2 and a specific surface area of from 3 to 60 m²/g.

6. A process according to claim 3, wherein the carbon source is carbon black or colloidal graphite having a specific surface area within the range of from 10 to 400 m²/g.

7. A process according to claim 3, wherein the carbon source is selected from a phenol-formaldehyde condensation product, coal-tar pitch and mixtures thereof.

8. A process according to claim 3, wherein, prior to the pressureless sintering, the preshaped green body is preheated in the presence of an inert or reducing atmosphere to a temperature within the range of from 100° to 1500° C.

9. A process according to claim 3, wherein the preshaped green body is pressureless sintered in a protective gas atmosphere at a pressure of approximately 0.1 MPa or in vacuo at a pressure of less than 5000 Pa.

10. A process according to claim 3, wherein sintered articles are post-densified, without a capsule at a temperature of less than about 2050° C. under a gas pressure of from 150 to 250 MPa.

* * * * *